US010436095B2

(12) United States Patent
Greber et al.

(10) Patent No.: US 10,436,095 B2
(45) Date of Patent: Oct. 8, 2019

(54) EXHAUST LINE WITH A REAGENT INJECTOR

(71) Applicant: Faurecia Systemes D'Echappement, Nanterre (FR)

(72) Inventors: Frederic Greber, Ecot (FR); Christophe Tournier, Exincourt (FR); Sebastien Gaspard, Fesches le Chatel (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 215 days.

(21) Appl. No.: 15/272,482

(22) Filed: Sep. 22, 2016

(65) Prior Publication Data
US 2017/0089246 A1  Mar. 30, 2017

(30) Foreign Application Priority Data

Sep. 29, 2015 (FR) ..................... 15 59199

(51) Int. Cl.
| | |
|---|---|
| *F01N 3/28* | (2006.01) |
| *F01N 3/20* | (2006.01) |
| *B01F 5/04* | (2006.01) |
| *B01F 5/06* | (2006.01) |
| *B01F 3/04* | (2006.01) |
| *B01F 5/00* | (2006.01) |

(52) U.S. Cl.
CPC ........ *F01N 3/2892* (2013.01); *B01F 3/04049* (2013.01); *B01F 5/0473* (2013.01); *B01F 5/0647* (2013.01); *F01N 3/2073* (2013.01); *B01F 2005/0091* (2013.01); *F01N 2240/20* (2013.01); *F01N 2610/02* (2013.01); *F01N 2610/1453* (2013.01)

(58) Field of Classification Search
CPC ............ F01N 2240/20; F01N 2610/02; F01N 2610/1453; F01N 3/2073; F01N 3/2892
USPC .......................................... 60/286, 303, 324
See application file for complete search history.

(56) References Cited

U.S. PATENT DOCUMENTS 8,661,792 B2  3/2014  Greber

FOREIGN PATENT DOCUMENTS

| EP | 2652279 A1 | 10/2013 |
|---|---|---|
| EP | 2775114 A1 | 9/2014 |

OTHER PUBLICATIONS

French Search Report dated Jul. 20, 2016.

*Primary Examiner* — Phutthiwat Wongwian
*Assistant Examiner* — Diem T Tran
(74) *Attorney, Agent, or Firm* — Carlson, Gaskey & Olds, P.C.

(57) ABSTRACT

The exhaust line comprises an injection segment including at least one cup having a large upstream face directly sprayed with the exhaust gases and dividing a circulation passage into an upstream space and a downstream space. The injection segment comprises at least one circumferential conduit fluidically connecting the upstream space to the downstream space. The cup defines at least one injection channel and at least one guiding area laid out so as to guide as far as said injection channel a portion of the exhaust gases spraying the large upstream face. An injection device includes a reagent injector that is oriented to inject the reagent substantially with a co-current or counter-current of the exhaust gases in the injection channel, with the latter extending from the injector as far as the inlet of the conduit.

15 Claims, 12 Drawing Sheets

EXHAUST LINE WITH A REAGENT INJECTOR

CROSS-REFERENCE TO RELATED APPLICATIONS

This application claims priority to FR 15 59199, filed Sep. 29, 2015.

TECHNICAL FIELD

The invention generally relates to exhaust lines of an automobile vehicle equipped with devices for injecting a reagent, typically a reagent provided for reducing nitrogen oxides. More specifically, the invention deals with an exhaust line of the type that includes upstream and downstream units for treating exhaust gases flowing in the exhaust line. The upstream and downstream units are placed in series in the exhaust line. An injection segment comprises an envelope interiorly delimiting a circulation passage for circulation of an exhaust gases flow extending from one outlet face of the upstream unit as far as an inlet face of the downstream unit. The circulation passage has a central line having a determined length between the outlet and inlet faces. The injection segment includes at least one cup positioned inside the circulation passage in the path of the exhaust gas flow so that the average path of exhaust gas veins is greater by at least 20% relatively to the determined length. The cup has a large upstream face directly sprayed with the exhaust gases leaving the upstream unit and dividing the circulation passage into an upstream space extending between the outlet face and the cup, and a downstream space extending between the cup and the inlet face. An injection device includes a reagent injector provided to inject the reagent into the injection segment.

BACKGROUND

Such an exhaust line is known from FR 2 947 003. It has the drawback that the quality of the mixture of the reagent with the exhaust gas flow varies according to the flow rate of exhaust gas.

In this context, the invention is directed to propose an exhaust line which does not have this defect, but wherein the injection segment remains particularly compact, like in FR 2 947 003.

SUMMARY

The invention deals with an exhaust line of the aforementioned type, and which includes the following features. The injection segment comprises at least one conduit fluidically connecting the upstream space to the downstream space, with the conduit having at least one inlet opening into the upstream space and at least one outlet opening into the downstream space. Each inlet is connected to at least one outlet, and the conduit extends circumferentially around the central line. The cup defines at least one injection channel, and at least one guiding area is laid out so as to guide as far as said injection channel a portion of the exhaust gases spraying the large upstream face. The injector is oriented to inject the reagent substantially as a joint-current or as a counter-current of the exhaust gases in the injection channel, with the latter extending from the injector as far as the inlet of the conduit.

Because the reagent injection is substantially accomplished as a joint-current or as a counter-current of the exhaust gases in the injection channel, the quality of the mixture of the reagent in the exhaust gas flow depends very little on the flow rate of exhaust gas. Indeed, the reagent jet is not deviated by the exhaust gases. Thus, the reagent jet always has the same trajectory regardless of the exhaust gas flow rate.

On the contrary when the reagent jet is deviated by the exhaust gas flow, its point of impact and its trajectory move according to the flow rate, and therefore cannot be optimum regardless of the flow rate of exhaust gas. This is detrimental to the quality of the mixture of the reagent.

Moreover, the fact that the cup has a guiding area laid out so as to guide as far as the injection channel a portion of the exhaust gases, gives the possibility of conducting as far as the injection channel a sufficient amount of exhaust gas in order to ensure the mixing of the reagent jet. The exhaust gas flow loaded with reagent then passes through the conduit extending circumferentially around the central line, which gives the possibility of perfectly homogenizing the reagent in the exhaust gases. Indeed, the circumferential shape of the conduit contributes to obtaining a good mixture by amplifying the turbulences because of the crossing through the inlet of the conduit. This also gives the possibility of extending the path of the veins of exhaust gas, which also contributes to obtaining a good mixture. This result is obtained without having to separate both treatment units from each other.

According to a first embodiment, the invention may have one or several of the features below, considered individually or according to all the technically possible combinations: the cup defines at least one direct guidance area laid out to guide a second portion of the exhaust gases spraying the large upstream face directly as far as the inlet of the conduit without passing through the injection channel; the envelope has a rectilinear strip along the injection channel; the cup is shaped to have a main portion forming at least the injection channel and the guiding area, and a protruding portion towards the outlet face of the upstream unit relatively to the main portion, the guiding area being delimited on one side by the envelope, on the other side by the protruding portion, and opening into the injection channel; the protruding portion extends from a peripheral edge of the cup as far as a center of the cup; the protruding portion delimits an outlet of the conduit opening into the downstream space; and the envelope comprises two half-shells delimiting between them the conduit.

The exhaust line according to the first embodiment may further have the features below: the guiding area opens into the guiding channel at an upstream end of said guiding channel close to the injector; the protruding portion is part of the direct guiding area, the direct guiding area further comprising an intermediate area which is part of the main portion, interposed between the inlet and the protruding portion; the inlet includes a first portion placed in the extension of the injection channel, and a second portion adjoining the intermediate area; the injection segment comprises a protective plate, covering the injection channel on the upstream side, the injection channel being thereby defined between the protective plate and the cup.

According to a second embodiment, the exhaust line may have one or several of the features below, considered individually or according to all the technically possible combinations: the injection segment comprises two conduits fluidically connecting at least one inlet to at least one outlet opening into the downstream space, and extending circumferentially in the opposite direction from the inlet around the central line; the cup has two wings positioned on either side of the injection channel, both wings being tilted so that from the injection channel, they separate from each other and extend towards the upstream unit; the conduits are delimited by an external wall, the external wall including a vertical rib parallel to the central line, at the center of the inlet; each conduit is delimited outwards by the envelope and is open towards the inside over substantially the whole of its length; and the wings have notches on either side of the inlet, for letting through exhaust gases from the inlet into the conduits.

The exhaust line according to a second embodiment of the invention may further have one or several of the features below: the injection channel extends along a diameter of the cup; the external wall of the conduit includes two horizontal ribs, substantially perpendicular to the vertical rib and positioned on either side of the vertical rib; at least one outlet is cut out in the tubular portion for each conduit, this outlet opening into the downstream space; the injection conduit includes a deflector bound to the cup, each conduit being delimited towards the downstream unit by the deflector and towards the upstream unit by one of the wings of the cup; the injection channel flares out from the injector as far as the inlet.

Moreover, the exhaust line, according to the first and second embodiments, may have one or several of the features below. The envelope comprises a tubular portion in which is accommodated the cup and a shell added onto the tubular portion and delimiting said or each conduit; the envelope comprises a tubular portion in which is accommodated the cup and a shell made in one piece with the tubular portion and protruding outwards from the tubular portion, the shell delimiting said or each conduit; the injection segment further comprises an internal tube accommodated in the tubular portion, each conduit being delimited between the shell and the internal tube, the internal tube being preferably made in one piece with the cup. The injector is oriented to inject the reagent along an injection direction substantially perpendicular to the central line; the injection channel is extended along a direction substantially perpendicular to the central line; the injection channel is rectilinear; the cup has a large upstream face turned towards the upstream unit, the large upstream face delimiting the injection channel and the guidance area.

Further, in the exhaust line according to the first and second embodiments, the envelope advantageously comprises a tubular portion in which is accommodated the cup and a shell delimiting the conduit, the shell protruding outwards relatively to the tubular portion.

These and other features may be best understood from the following drawings and specification.

BRIEF DESCRIPTION OF THE DRAWINGS

Other features and advantages of the invention will become apparent from the detailed description which is given below, as an indication and by no means as a limitation, with reference to the appended figures, wherein.

DETAILED DESCRIPTION

Figure 1:
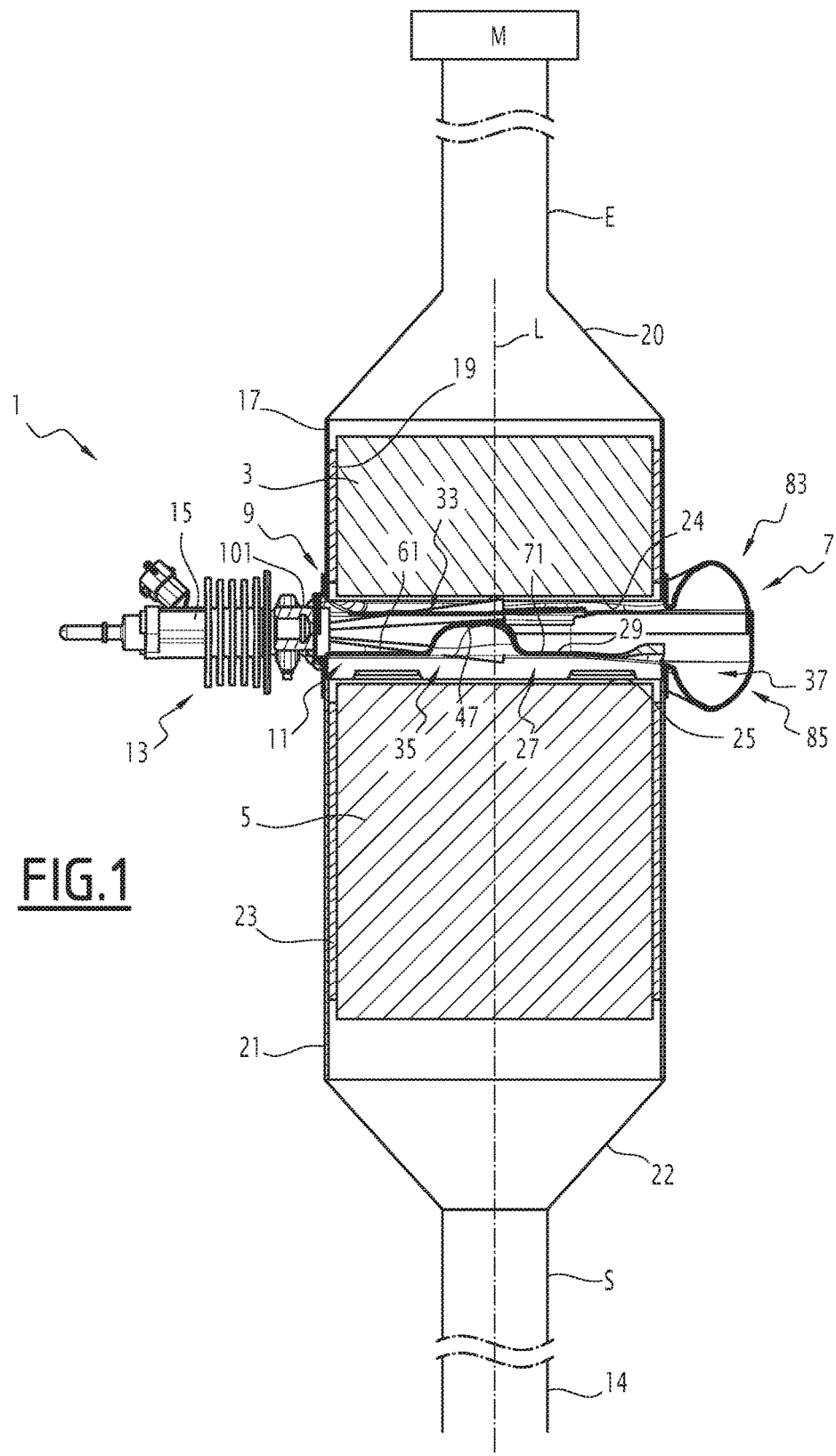
FIG. 1 is a sectional view of a portion of an exhaust line according to a first embodiment of the invention.

The exhaust line 1 partly illustrated in FIG. 1 is intended to equip a vehicle, typically an automobile vehicle such as a car or a truck.

It is more particularly intended to equip a vehicle equipped with a diesel engine.

The exhaust line 1 comprises: upstream and downstream units 3, 5 for treating exhaust gases circulating in the exhaust line, the upstream and downstream units 3, 5 being placed in series in the exhaust line 1; an injection segment 7 comprising an envelope 9 interiorly delimiting a passage 11 for circulation of an exhaust line flow; and an injection device 13 including a reagent injector 15 provided to inject reagent into the injection segment 7.

The exhaust line 1 captures exhaust gases leaving a heat engine M of the vehicle, and leads the gases as far as the upstream unit 3. Moreover, the exhaust gases leaving the downstream unit 5 are led by the exhaust line as far as a cannula 14 for discharging into the atmosphere.

The upstream unit is typically an oxidation catalyst (DOC Diesel Oxidation Catalyst) or an NSC (NOx Storage Catalyst) also called LNT (Lean NOx Trap), or further a PNA (Passive NOx Adsorber).

The downstream unit is an SCR (Selective Catalytic Reduction) catalyst, or further an SCRF (Selective Catalyst Reduction Filter). The SCRF is a particle filter (PF or DPF) covered with catalyst metals for operating as an SCR.

In an SCR catalyst, the nitrogen oxides contained in the exhaust gases are reduced to nitrogen gas, in the presence of a reducing agent. This reducing agent is typically ammonia.

The reagent injected by the injection device is typically in liquid form. Alternatively, the reagent is in a gas form.

The injected reagent is for example liquid ammonia, urea, for example as a 30% urea aqueous solution generally marketed under the name of Adblue, or further ammonia gas (ASDS (Ammonia Storage and Delivery System) technology, or system for storing and diffusing ammonia). The urea, in the injection segment, is evaporated and is subject to a thermolysis operation, i.e. a thermal decomposition operation generating ammonia gas.

If the injected reagent is liquid ammonia, the latter is only subject to a vaporization operation in the injection segment.

The upstream unit 3 is accommodated in an upstream external tube 17, with interposition of a maintaining web 19 between the unit 3 and the upstream external tube 17. The exhaust line 1 comprises an inlet conduit E, and a divergent cone 20 connecting the inlet conduit E to the upstream external tube 17. The inlet conduit E fluidically communicates with the engine M. Also, the downstream unit 5 is accommodated in a downstream external tube 21, with interposition of a downstream maintaining web 23 between the tube 21 and the unit 5.

The exhaust line 1 includes an outlet conduit S and a convergent cone 22 connecting the downstream external tube 21 to the outlet conduit S. The outlet S fluidically communicates with the cannula 14.

The passage 11 for circulation of the exhaust gases extends from an outlet face 24 of the upstream unit as far as an inlet face 25 of the downstream unit 5.

The circulation passage 11 has a central line L with a length determined between the outlet and inlet faces 24, 25. The central line L is the line passing through the geometrical centers of the cross-sections of the circulation passage 11. In the illustrated example, the central line coincides with the central axes of the upstream and downstream units 3, 5. It is perpendicular to the outlet and inlet faces 24, 25.

Moreover, the injection segment 7 includes at least one cup 27 positioned inside the circulation passage 11 in the path of the flow of exhaust gas, so that the average path of the exhaust gas veins covering the passage 11 is greater by at least 20% based on the determined length. In other words, the cup 27 is provided to extend the path of the exhaust gases covering the circulation passage, which facilitates evaporation and mixing of the reagent with the exhaust gases.

Typically, the injection segment 7 includes a single cup 27.

The cup 27 has a large upstream face 29 directly sprayed with the exhaust gases leaving the upstream unit.

In other words, there does not exist another cup interposed between the upstream unit 3 and the cup 27, and channeling the exhaust gases along a certain path. The exhaust gases leaving the upstream unit 3 through the outlet face 24 directly encounter the cup 27, without being deviated beforehand by a large size obstacle. Thus, the quasi-totality of the large upstream face 29 is directly located facing the outlet face 24, for example at least 75% of the large face 29.

The cup 27 divides the circulation passage 11 into an upstream space 33 extending between the outlet face 24 and the cup 27, and a downstream space 35 extending between the cup 27 and the inlet face 25.

Moreover, the injection segment 7 comprises at least one conduit 37 fluidically connecting the upstream space 33 to the downstream space 35.

In the first embodiment of the invention, illustrated in FIGS. 1 to 8, the injection segment 7 includes a single conduit 37. This conduit 37 has an inlet 39 opening into the upstream space 33, and extends circumferentially from the inlet 39 around the central line L as far as an outlet 41 (FIG. 3) opening into the downstream space 35.

The envelope 9 has, perpendicularly to the central line L, an internal section, the cup 27 having a shape mating this internal section. In other words, the cup 27 extends over the whole internal section of the envelope 9, or the quasi-totality of the internal section of the envelope 9. Typically, the cup 27 is circular.

The exhaust gases, in order to circulate from the upstream space 33 to the downstream space 35, are forced to pass through the conduit 37.

Figures 2, 3:
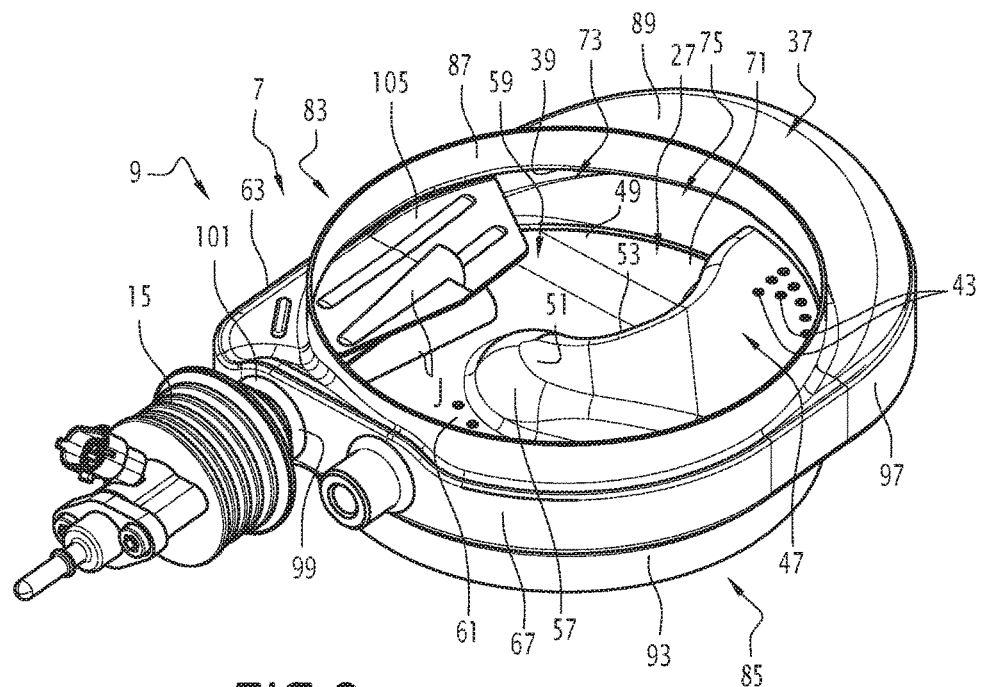
FIG. 2 is a perspective view of an injection segment of the exhaust line of FIG. 1.
FIG. 3 is a front sectional view of the injection segment of FIG. 2.
Figure 4:
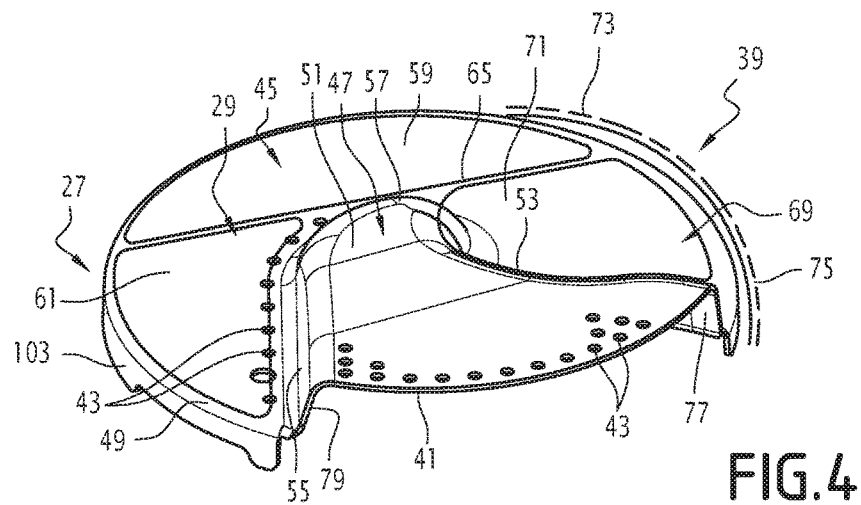
FIG. 4 is a perspective view of a cup of the injection segment of FIG. 2.

However, it should be noted that, as notably illustrated in FIGS. 2 and 4, the cup 27 has in predetermined locations small perforations 43 allowing direct passage of the exhaust gases from the upstream space 33 to the downstream space 35 through the cup 27. The flow rate of the exhaust gases passing through the perforations 43 is however much smaller than the flow rate of exhaust gases passing through the conduit 37.

The perforations 43 typically have two functions: correcting the distribution of reagent at the inlet face 25 of the downstream unit, in the case when too large concentrations of reagent are observed in certain points; and reducing the overall counter-pressure of the injection segment 7, while decreasing the amount of exhaust gases passing in the conduit 37.

Alternatively, the cup 27 is not pierced by perforations 43, and is entirely leak-proof for the exhaust gases.

The conduit 37 extends circumferentially around the central line L, in the sense that it describes an arc centered on the central line L. This arc is a circular arc or with a shape not very different from a circular arc.

The cup 27 is a metal plate with a small thickness. As visible in FIG. 4, it is shaped to have a main portion 45, and a portion 47 protruding towards the outlet face 24 of the upstream unit relatively to the main portion 45.

The protruding portion 47 extends from an external peripheral edge 49 of the cup as far as the center 51 of this cup.

For example, the protruding portion 47 it has the shape of a comma.

More specifically, the protruding portion 47 has a width decreasing from the external edge 49 towards the center 51. By width is meant the dimension of the protruding portion 47 substantially circumferentially around the central axis L.

The protruding portion 47 is laterally delimited towards the inlet 39 by a curved edge 53. It is delimited opposite the inlet 39 by a straight edge 55. The edges 53 and 55 converge towards each other from the external edge 49 of the cup as far as the center 51. At the center 51, they are connected to each other through an edge 57 substantially as a circular arc, extending over about 180°.

The curved edge 53 is concave towards the inlet 39.

The top of the portion 47 is substantially planar and perpendicular to the central line L.

Also, in the illustrated example, the main portion 45 is substantially planar and perpendicular to the central line L. The main portion 54 has the shape of a C, and extends around the protruding portion 47.

As notably illustrated in FIG. 4, the cup 27 defines at least one injection channel 59 and at least one guiding area 61 laid out so as to guide as far as the injection channel 59 a portion of the exhaust gases spraying the large upstream face 29. The injection channel 59 and the guiding area 61 are formed in the main portion 45.

The injection channel 59 extends from the injector 15 as far as the inlet 39 of the conduit.

The injection channel 59 and the guiding area 61 are delimited by the large upstream face 29 of the cup 27.

The injection channel 59 is rectilinear.

The injection channel 59 is substantially perpendicular to the central line L.

The envelope 9 has a rectilinear strip 63 along the injection channel 59, visible in FIG. 2. This rectilinear strip is planar. It delimits one side of the injection channel 59. It extends parallel to the injection direction.

The injection channel 59, opposite the rectilinear strip 63, is delimited by a fictitious line 65, materialized in FIG. 4. The fictitious line 65 is parallel to the injection direction and is substantially tangent to the edge 57. The fictitious line 65 adjoins the center 51.

Thus, the injection channel 59 does not pass through the center 51, and does not extend along a diameter of the cup 27. It is shifted relatively to the center 51, and extends along a chord.

The guiding area 61 is delimited on one side by the envelope 9, on the other side by the protruding portion 47, and opens into the injection channel 59.

As visible in FIG. 2, the guiding area 61 is delimited by a portion of the envelope 9 forming a circular arc 67. Moreover, the guiding area 61 is delimited by the rectilinear edge 55 of the protruding portion 47, and is therefore located on one side of the protruding portion 47 opposite to the inlet 39. It opens into the injection channel 59 on the side of the fictitious line 65, and opens into the injection channel 59 at an upstream end of said guiding channel 61, which is close to the injector 15.

Moreover, the cup 27 defines at least one direct guiding area 69, laid out to guide a second portion of the exhaust gases spraying the large upstream face 29 directly as far as the inlet 39 of the conduit 37, without passing through the injection channel 59. The protruding portion 47 is part of the direct guiding area 69, the latter further comprising an intermediate area 71 which is part of the main portion 45, interposed between the inlet 39 and the protruding portion 47. The intermediate area 71 is therefore delimited on one side by the inlet 39, on another side by the curved edge 53 of the portion 47, and finally by the fictitious line 65.

As visible in FIGS. 2 to 4, the inlet 39 extends along the external edge 49 of the cup 27, and has a large size. The inlet 39 includes a first portion 73 placed in the extension of the injection channel 59, and a second portion 75 adjoining the intermediate area 71. Preferably, both of these portions 73, 75 communicate with each other and are not separated by a physical barrier.

As this clearly appears in FIGS. 3 and 4, the protruding portion 47 delimits the outlet 41 of the conduit 37, and opens into the downstream space 35. The outlet 41 corresponds to the end of the protruding portion 47 extending along the external edge 49 of the cup 27.

The outlet 41 is delimited towards the downstream side by the envelope 9, towards the upstream side by the protruding portion 47, and circumferentially, at both of its opposite ends, by the ends of the edges 53 and 55, referenced here as 77 and 79. The inlet 39 circumferentially extends from the planar strip 63 as far as the end 77.

Figure 5:
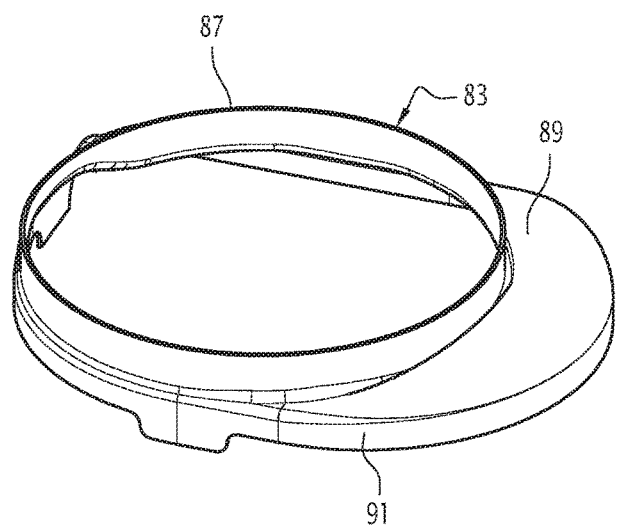
FIGS. 5 and 6 are perspective views of both half-shells forming an envelope of the injection segment of FIG. 2.
Figure 6:
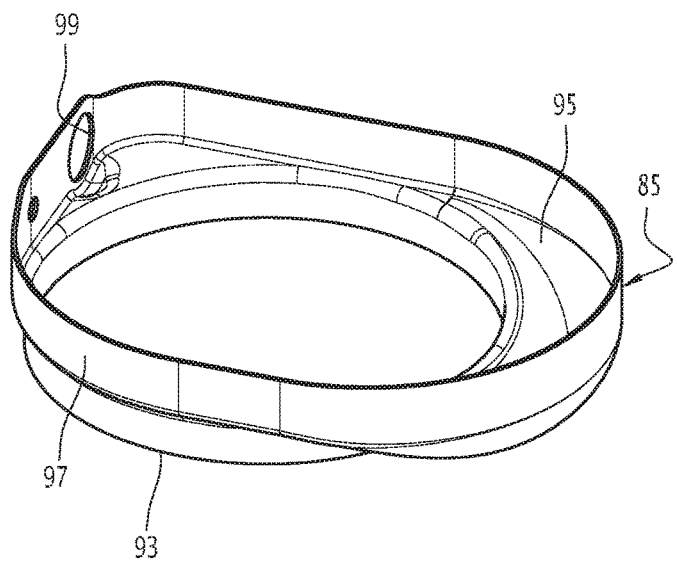

The envelope 9 comprises two half-shells 83 and 85, delimiting between them the conduit 37. These half-shells 83, 85 are illustrated in FIGS. 5 and 6.

The half-shell 83 includes a barrel stretch 87 of a circular shape, i.e. a substantially circular interface extrusion, centered on the central line L. The barrel stretch 87, and sealably connected to the upstream external tube 17, for example by welding.

The half-shell 83 further includes a portion 89 with a crescent shape, secured to the barrel stretch 87. The crescent portion 89 protrudes radially outside the barrel stretch 87. It extends over an angular sector comprised between 120° and 180°. The half-shell 83 further includes a peripheral fallen edge 91 protruding towards the downstream unit 5, and extending over the whole periphery of the half-shell 83.

The half-shell 85 itself also includes a barrel stretch 93, with a circular shape, centered on the central line L. The barrel stretch 93 is sealably connected to the downstream external tube 21. The half-shell 85 further includes a crescent portion 95, substantially with the same shape as the portion 89, and protruding radially outwards relatively to the barrel stretch 93. The half-shell 85 has a fallen edge 97, extending over the whole periphery of the half-shell 85 and protruding outwards the upstream unit. The rectilinear strip 63 is part of the fallen edge 97.

An orifice 99 is made in the fallen edge 97 and receives an injector support 101, illustrated in FIG. 1 and in FIG. 2.

The injector 15 is mounted on the injector support 101. Thus, the injector is rigidly attached to the envelope 9.

The injector 15 is oriented to inject the reagent along an injection direction substantially perpendicular to the central line.

The fallen edges 91 and 97 are of a complementary shape. In the illustrated example, and as visible in FIG. 7, the fallen edge 91 fits into the fallen edge 97, both of these edges being rigidly attached, sealably relatively to each other, by any suitable method. For example, they are welded to each other.

The cup 27 has on a portion of its circumference a raised edge 103 protruding relatively to the main portion 45 towards the downstream unit 5. The raised edge 103 extends along the external edge 49 over the whole perimeter of the main portion 45. At the protruding portion 47, there is raised edge 103.

The cup 27 is engaged into the barrel stretch 93, and to do this the cup 27 has an external diameter substantially corresponding to the internal diameter of the barrel stretch 93. The cup 27 is typically rigidly attached to the half-shell 85, for example with welding spots or lines.

Thus, the envelope 9 comprises a tubular portion, the conduit 37 extending out of said tubular portion, and radially protruding outwards relatively to the tubular portion. In the embodiment of FIGS. 1 to 7, the tubular portion corresponds to the barrel stretches 87 and 93.

The passage section of the inlet 39 corresponds to the passage section of the outlet conduit S increased by about 20%. The inlet and outlet conduits substantially have the same passage section.

The passage section of the conduit 37 substantially has the same size as that of the inlet 39. Notably, at the end 77, the passage section provided to the exhaust gas is the same as at the inlet 39 or outlet 41.

It should be noted that, as illustrated in FIG. 1, the conduit 37 considered in section in a radial plane, containing the central line L, has an ovalized shape. This section is elongated parallel to the central line L. Thus, the height of the conduit 37, taken parallel to the central line L, is greater than the determined length separating the outlet 24 and inlet 25 faces. This gives the possibility, without excessively increasing the radial congestion of the injection segment, of providing an additional space for mixing the reagent and the exhaust gases, before the exhaust gases reach the inlet face 25.

The injection segment 7 moreover includes optionally a protective plate 105 (FIG. 2), covering the injection channel 59 towards the upstream unit 3. The injection channel 59 is thus defined between the protective plate 105 and the cup 27. The protective plate 105 only extends at right angles to the injection channel 59, and is rigidly attached to the envelope 9. The plate 105 extends in parallel, and at a distance from the main portion 45 of the cup 27.

The operation of the exhaust line described above, will now be detailed.

The exhaust gases arriving through the inlet conduit E cross the upstream unit 3. They leave the upstream unit 3 through the outlet face 24 and directly spray the large upstream face 29 of the cup. The portion of the exhaust gases spraying the direct guiding area 69, i.e. the protruding portion 47 and the intermediate area 71, are deviated by the cup 27 directly into the second portion 75 of the inlet 39 of the conduit (arrow F1 of FIG. 7). These exhaust gases do not cross the injection channel 59.

Figure 7:
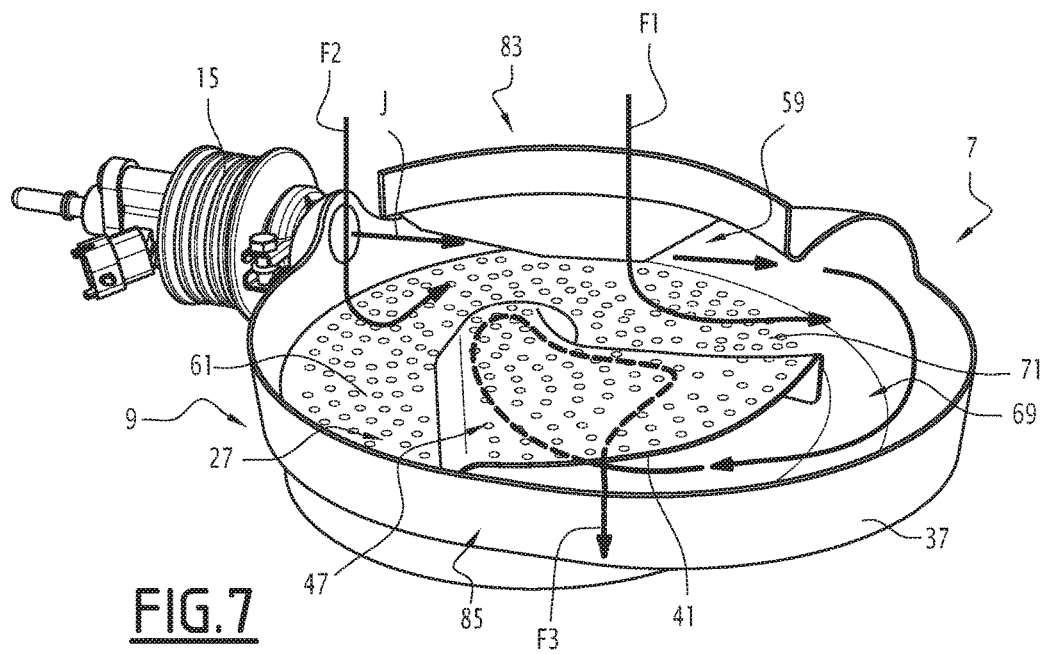
FIG. 7 is a perspective view illustrating the circulation of the exhaust gases in the injection segment of FIG. 2.

The fraction of the exhaust gases spraying the guiding area 61 is channeled as far as the guiding channel 59, as indicated by the arrow F2 in FIG. 7.

These exhaust gases, because of the circular arc shaped portion 67 of the envelope, tangentially enter the upstream end of the injection channel 59.

Moreover, because the rectilinear strip 63 is planar, they are rapidly oriented according to a substantially rectilinear trajectory, parallel to the injection direction.

The injector 15 injects the reagent in liquid form along the injection direction, which is substantially parallel to the injection channel. The reagent injection is therefore accomplished in a joint current flow of exhaust gases.

If the flow rate of the exhaust gases leaving the outlet face 24 decreases or increases, the reagent jet is practically not deviated.

Placement of the protective plate 105 covering the injection channel 59 on an upstream side, contributes to this result. However, the presence of this plate is optional and the system may also operate very well without it.

The reagent jet J, after having crossed the first portion 73 of the inlet, will hit the wall delimiting the conduit 37. The jet bursts into multiple droplets, which are carried away by the flow of exhaust gas from the injection channel 59.

Because of the crescent shape of the conduit 37, the exhaust gases change direction, which causes turbulences in the flow of exhaust gases and facilitates evaporation and mixing of the reagent within the flow of exhaust gas.

Moreover, the exhaust gases from the direct guiding area 69 interfere with the flow of the exhaust gases from the injection channel 59, which generates additional turbulences.

These turbulences give the possibility of mixing the flow lines loaded with reagent with those which are not loaded, i.e. the mixing of the gases having passed through the injection channel and those having passed through the direct guiding area 69. The mixing mainly takes place along the conduit 37.

After having covered the conduit 37, the exhaust gases cross the outlet 41 and penetrate into the downstream space 35. The exhaust gases are then diffused towards the inlet face 25 of the downstream monolith by the shape of the protruding portion 47. Indeed, the protruding portion 47, because of its comma shape, channels the exhaust gases flowing through the outlet 41 as far as the center of the inlet face 25 (arrow F3 of FIG. 7). This is not the natural movement of the exhaust gases, which, because of the shape of the conduit, perform a centripetal movement.

Indeed, the protruding portion 47 is convex towards the upstream unit 3 but delimits a concave area towards the downstream unit 5, favorable for guiding the exhaust gases as far as the center of the inlet face 25. Because the protruding portion 47 shrinks towards the center of the cup, it is possible to force the gases to supply the center of the inlet face 25 (funnel effect), in order to improve the distribution over the inlet face 25 of the downstream monolith.

The exhaust gases are thus uniformly distributed over the inlet face 25, which ensures efficient selective catalytic reduction.

It is important to emphasize that the exhaust gases stemming from the guiding area 61 arrive at an upstream end of the injection channel with an angle of about 30°. This will slightly deviate the reagent jet towards the outside of the channel, but in a very marginal way.

Moreover, the impact area of the reagent jet is placed as far as possible from the injector. This gives the possibility of evaporating as much as possible the reagent before entering the conduit, and thus limiting the occurrence of a deposit in the injection segment.

It should be noted that the protective plate 105 allows modification of the trajectory of the exhaust gases in the injection channel, by artificially generating a rotary movement of the gases ("swirl") around the injection axis, contributing to the mixing in the conduit 37. The use of the protective plate 105 also gives the possibility of not inflecting the reagent jet towards the cup 27, notably at a high flow rate of exhaust gas.

The injector 15 is of any other suitable type. For example, it is of the type with one jet, two jets or three jets.

In the case of injection using a three-jet injector, it is possible to orient the injector so that one of the jets impacts the protective plate 105, which gives the possibility of loading the flow of exhaust gas with reagent in the actual inside of the injection channel.

In the embodiment illustrated in FIGS. 1 to 7, the half-shells 83 and 85 are obtained by stamping, and by barrel stretch in order to obtain the stretches 87 and 93. The cup 27 is also stamped.

An alternative of the first embodiment of the invention will now be described with reference to FIG. 8. Only the points by which this alternative differs from that of FIGS. 1 to 7 will be detailed above. The identical elements or ensuring the same function will be designated by the same references in both alternatives.

In this alternative embodiment, the envelope 9 includes a tubular portion 107 in which is accommodated the cup 27, and a shell 109 added onto the tubular portion 107 and delimiting the conduit 37. For example, the tubular portion 107 is in one part, and therefore no longer comprises two half-shells fitted into each other like in FIGS. 1 to 7. Preferentially, the tubular portion 107 is in one piece with the upstream external tube 17 and the downstream external tube 21. By having a single and same part, it is possible to avoid the weld connections between the tubular portion 107 and both tubes. Alternatively, these are several tube segments, secured to each other by any suitable method.

The tubular portion 107 has an orifice not shown, with a circumferential orientation. This orifice delimits both the inlet 39 and the outlet 41 of the conduit 37. The inlet and the outlet are separated from each other typically by the end 77 of the curved edge 53.

The shell 109 is concave towards the tubular portion 107, and covers the whole circumferential orifice. The shell 109 is sealably added onto an external surface of the tubular portion 107. The shell 109 is preferably obtained by hydroforming.

Figure 8:
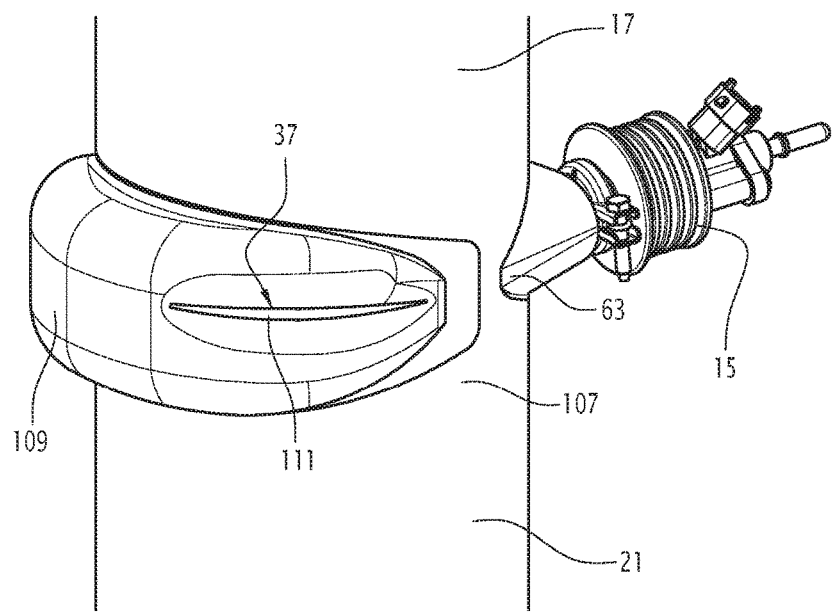
FIG. 8 is a perspective view illustrating an alternative of the first embodiment of the invention.
Figure 9:
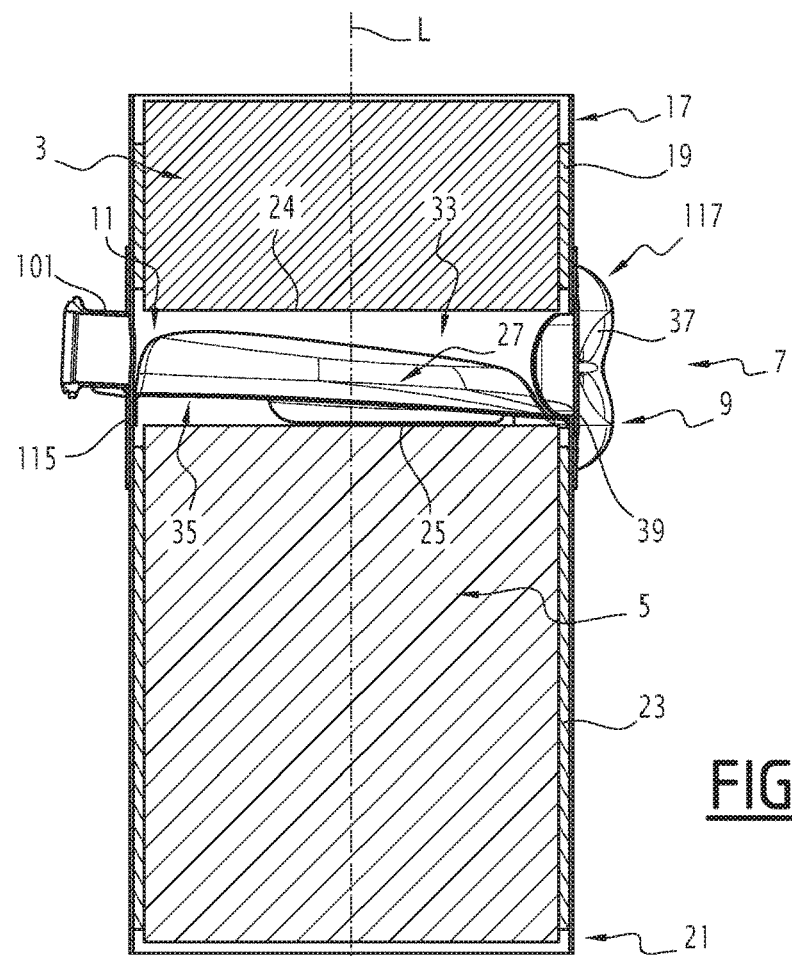
FIG. 9 is a sectional view of an exhaust line portion according to a second embodiment of the invention.

A second alternative embodiment is itself also illustrated in FIG. 8.

The wall delimiting the conduit 37 outwards, advantageously has a rib 111 protruding towards the inside of the conduit 37. This rib 111 is formed in the impact area of the reagent jet. The rib 111 extends in a plane substantially perpendicular to the central line L. Alternatively, the rib 111 extends in a plane forming an angle comprised between plus 30° and minus 30° relatively to the perpendicular to the central line L. The outer wall may have a single rib, or two ribs, or more than two ribs, parallel with each other preferably.

The ribs 111 give the possibility of increasing the turbulences inside the conduit 37, and therefore of improving the mixing between the reagent and the exhaust gases.

According to further another alternative embodiment, not shown, the shell 109 is made in the same material with the tubular portion 107. In this case, the envelope 9 is obtained by hydroforming. An internal tube 151, accommodated in the tubular portion 105, gives the possibility of materializing the inlet and outlet windows of the conduit 37.

The injection direction is not strictly parallel to the injection channel 59. Typically, the angle between the injection direction and the rectilinear strip 63 is comprised between plus 20° and minus 20°. Beyond, the trajectory of the reagent jet would be deviated too much by the gas flow, and in certain cases, with a strong gas flow, a portion of the reagent jet would not be able to always spray the same area of the external wall of the conduit. Moreover, the jet may also hit the end of the protruding portion 47.

The shape of the section of the conduit 37 may be modified, in order to take into account the congestion constraints. It may be more or less high and more or less deep.

Typically, the determined length between the outlet and inlet faces 24, 25 is comprised between 30 and 70 mm, and for example has the value of 40 mm. The height of the conduit 37, taken parallel to the central line L, typically has a value of 50% more than the determined length.

The height of the conduit 37 generally varies between 40 and 70 mm and the width between 40 and 60 mm. Beyond these limits, the turbulences contributing to good mixing of the reagent in the exhaust gas decrease, which degrades the quality of the mixture.

If the determined length separating the upstream outlet face 24 from the downstream inlet face 25 exceeds 70 mm, the counter-pressure decreases but the size of the inlet has to be significant. It is then difficult to retain the same mixture quality, even by incorporating one or several ribs such as the rib 111.

The upstream and downstream units 3 and 5 are typically aligned with each other, in the sense that they have respective central axes aligned with each other. Alternatively, said central axes form an angle between them, this angle being comprised between plus 30° and minus 30°.

The conduit 37 typically extends over an angular sector of 180°. This value may vary between 150 and 230°. A significant length has the advantage of extending the transit time of the exhaust gases, and gives the possibility of better mixing the gases with the reagent.

The length and the shape of the protruding portion 47 may also vary, provided that there is no interference between the end of the portion 47, corresponding to the center of the cup, and the jet of the injector.

A second embodiment of the invention will now be described, with reference to FIGS. 9 to 14. Only the points through which this second embodiment is different with the first will be detailed below. The identical elements having the same functions will be designated with the same references in both embodiments.

In the second embodiment, the injection segment 7 comprises two conduits 37, each fluidically connecting the upstream space 33 to the downstream space 35. Both conduits 37 extend circumferentially in the opposite direction, around the central line, from a single inlet 39.

The cup 27 has a shape different from the one of the first embodiment. As visible in FIG. 10, the injection channel 59 extends along a diameter of the cup 27.

Moreover, the cup 27 has two wings 113 positioned on either side of the injection channel 59.

Both wings are typically symmetrical with each other with respect to the injection channel 59.

Both wings 113 are tilted so that, from the injection channel 59, they move away from each other and extend towards the upstream unit 3. Both wings 113 move away from each other along a radial direction. In other words, considered perpendicularly to the injection direction, the cup 27 has V-shaped sections. The wings of the V are typically slightly convex towards the upstream unit 3.

Each wing 113 defines a guiding area similar to the guiding area 61 of the first embodiment, laid out so as to guide as far as the injection channel 59 a portion of the exhaust gases spraying the large upstream face 29 of the cup 27.

Figure 10:
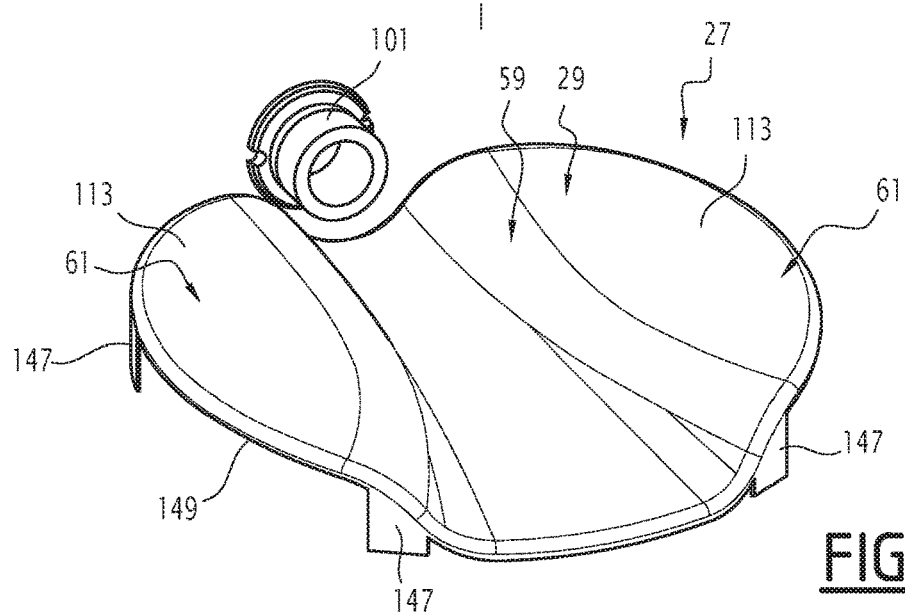
FIG. 10 is a perspective view of a cup of FIG. 9.

As visible in FIG. 10, the injection channel 59 is flared from the injector 15 as far as the inlet 39. In other words, the bottom of the channel 59, considered perpendicularly to the injection direction, has a relatively smaller width and a relatively more pronounced curvature in proximity to the injector 15. On the contrary, in proximity to the inlet 39, the bottom of the injection channel 59 is relatively larger and has a relatively less pronounced curvature.

In the exemplary embodiment of FIGS. 9 to 14, the envelope 9 includes a tubular portion 115 in which is accommodated the cup 27, and a shell 117 added onto the tubular portion 115 and delimiting the conduits 37.

Typically, the tubular portion 115 has, considered perpendicularly to the central line, the same section as the upstream external tube 17 and the downstream external tube 21.

In this case, the upstream external tube 17, the tubular portion 115 and the downstream external tube 21 are typically a single and same tube, and are made together in one piece.

Alternatively, these are several tube segments, secured to each other with all suitable methods.

Figure 13:
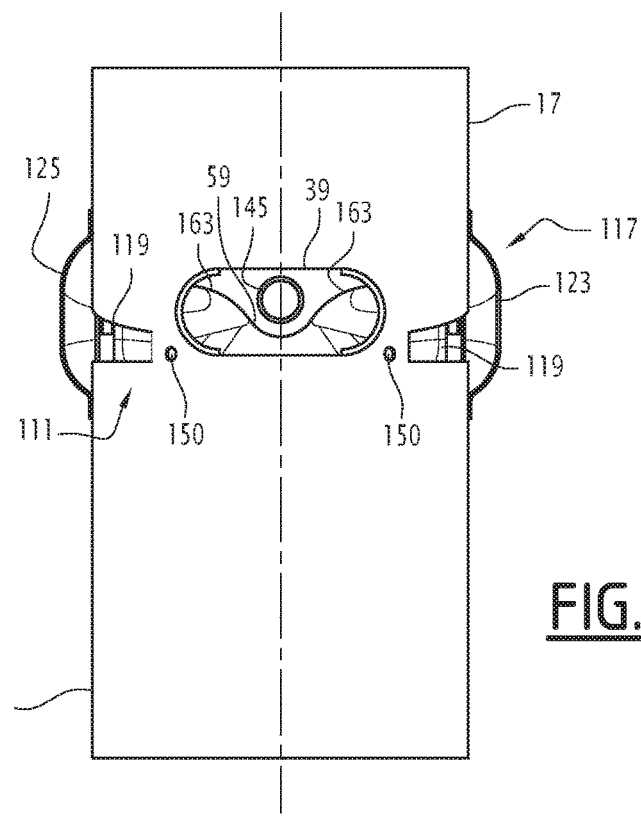
FIG. 13 is a front view of a tubular portion of an envelope of FIG. 9, and with conduits being illustrated as sections.
Figure 14:
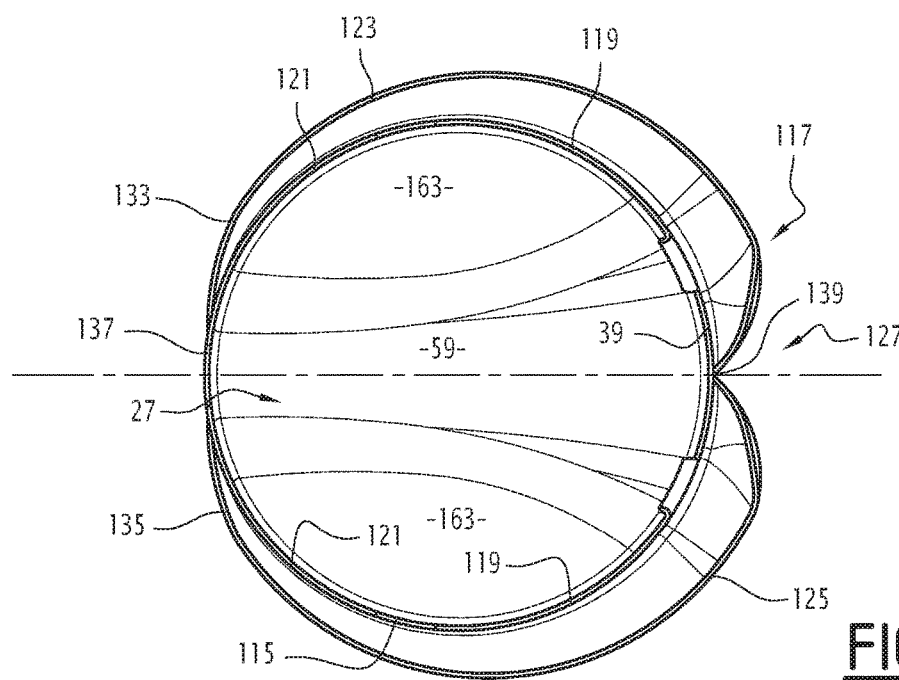
FIG. 14 is a sectional view in a plane perpendicular to the central line, showing the shape of the circumferential conduits of FIG. 9.

The inlet 39 is cut out in the tubular portion 115, as more particularly visible in FIG. 13.

Moreover, at least one outlet 119 is cut out in the tubular portion 115 for each conduit 37.

In the example illustrated in FIGS. 9 to 14, two outlets 119, 121 are cut out in the tubular portion for each conduit 37.

The outlets 119, 121 open into the downstream space 35.

The outlets 119 and 121 are circumferentially shifted relatively to each other, the outlet 119 being circumferentially closer to the inlet 39, and the outlet 121 further away therefrom.

Figure 12:
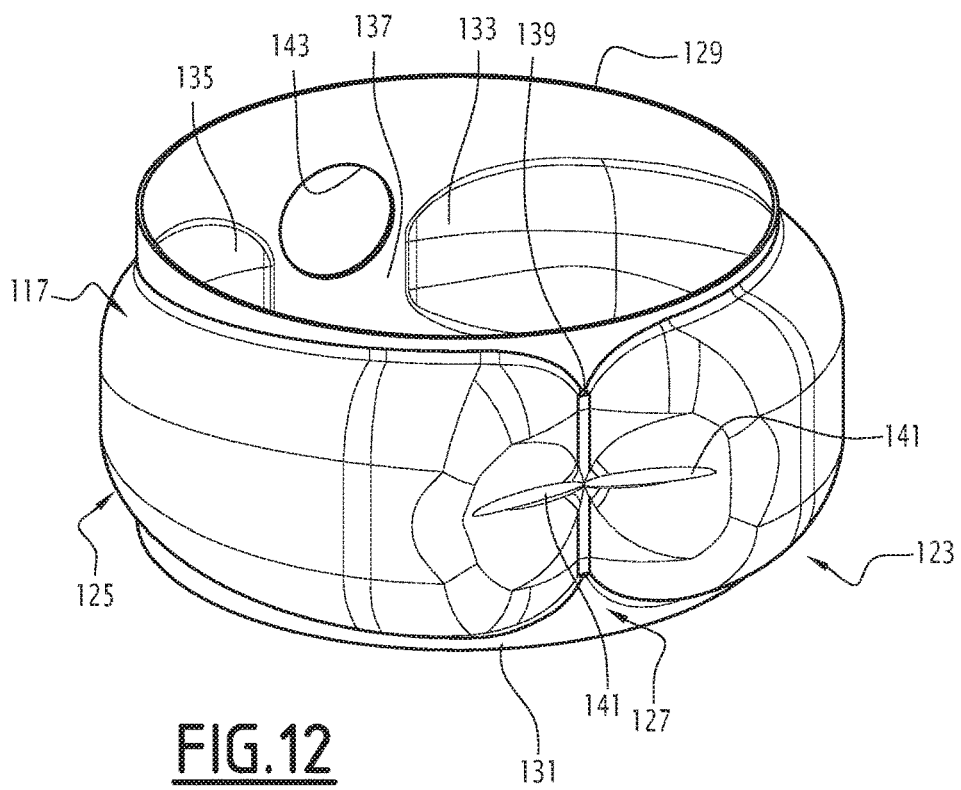
FIG. 12 is a perspective view of a shell delimiting the conduits in FIG. 9.

The shell 117 has the general shape of a ring, as illustrated in FIG. 12. This ring completely surrounds the tubular portion 115, and is added against the external surface of the tubular portion 115. It covers the inlet 39 and the outlets 119, 121. The shell 117 is substantially coaxial with the central line L.

As visible in FIG. 12, the shell 117 comprises two concave areas 123, 125 extending circumferentially in the opposite direction from an impact area 127 intended to be placed facing the inlet 39. The shell 117 further includes an upper circumferential edge 129 and a lower circumferential edge 131 delimiting the shell respectively towards the upstream unit 3 and towards the downstream unit 5. The edges 129 and 131 are of a cylindrical shape and have an internal diameter substantially equal to the external diameter of the tubular portion 115. The edges 129, 131 are flattened against the tubular portion 115 and sealably attached to the external surface of the tubular portion 115. The concave areas 123, 125 protrude radially outwards relatively to the circumferential edges 129, 131 and are open towards the inside.

Each of the concave areas 123, 125 extend over slightly less than 180° from the impact area 127. It has respective ends 133 and 135, which are separated from each other by a strip 137 connecting the lower and upper edges 129, 131 to each other. The strip 137 is sealably flattened against the external surface of the tubular portion 115, so that the exhaust gases cannot pass from the end 133 to the end 135.

The shell 117, which defines the external wall of the conduits 37, has a vertical rib 139, parallel to the central line L, at the center of the inlet 39. This rib extends over the major portion of the height of the conduits 37, the height being taken parallel to the central line L. The rib 139 is made on the impact area 127.

Moreover, as this is visible in FIG. 12, the external wall of the conduits i.e. the shell 117, preferably has two horizontal ribs 141, positioned on either side of the vertical rib 139, in the impact area 127. Each horizontal rib 141 extends in a plane perpendicular to the central line L. It protrudes towards the inside of the conduits 37. The function of the ribs 139 and 141 will be specified later on.

The tubular portion 115 and the shell 117 have respective orifices 143, 145, placed facing each other, for receiving the injector support 101. The orifices 143 and 145 are diametrically opposite to the inlet 39 relatively to the central axis L.

Moreover, the cup 27 has several attachment tabs 147 (FIG. 10), connected to a peripheral edge 149 of the cup. These tabs 147 extend towards the downstream unit 5, along the central line L, from the peripheral edge 149. The tubular portion 115, as visible in FIG. 13, has holes 150 facing the tabs 147, these holes giving the possibility of achieving a plug weld attaching the cup 27 to the tubular portion 115.

Thus, like in the first embodiment, the conduits 37 are located on the outside of the volume delimited by the tubular portion. This gives the possibility of extending the average path of the exhaust gas veins, without excessively increasing the congestion of the injection segment 7 parallel to the central line L.

Like in the first embodiment, the passage section provided to the exhaust gases in each of the conduits 37 corresponds to the passage section in the outlet conduit S, plus 20%. In order not to excessively increase the radial congestion of the injection segment, the shell 117 is conformed so that each conduit 37 has a significant height and a reduced depth. The height is taken here parallel to the central line L and the depth radially. Thus, the concave areas 123, 125 are conformed so that the conduits 37 have heights greater than the predetermined length separating the outlet face 24 from the inlet face 25 (see FIG. 13).

In the illustrated example, the height attains 70 mm, for a predetermined length of 40 mm.

Figure 11:
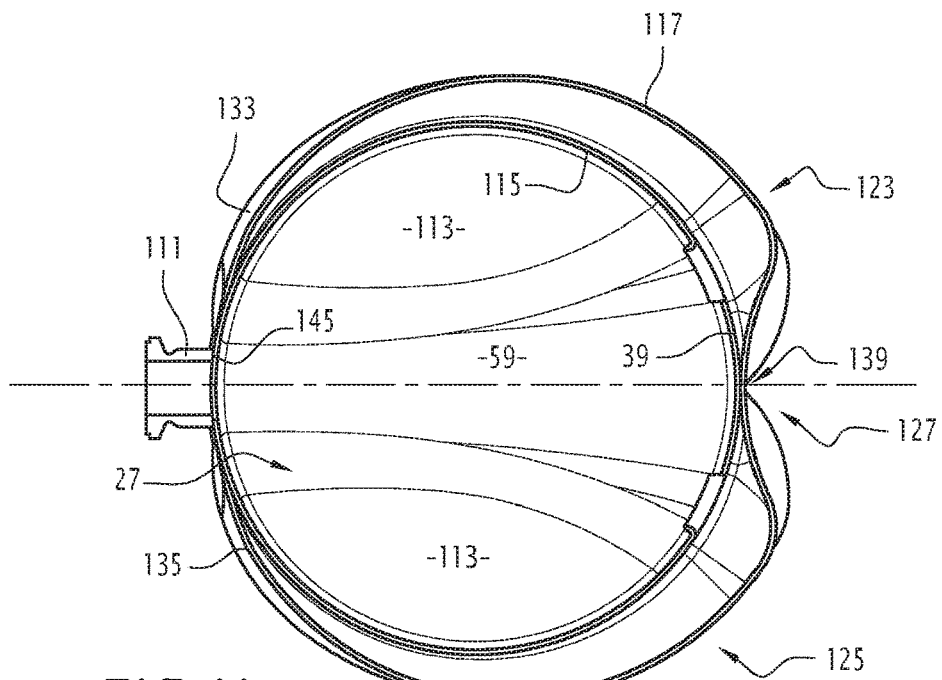
FIG. 11 is a top view of an injection segment of the exhaust line of FIG. 9.

As notably visible in FIGS. 11 and 12, the height and the depth of the concave portions 123, 125 decrease from the inlet 39 as far as the ends 133, 135. Indeed, the amount of exhaust gas circulating in the conduits 37 decreases when each conduit 37 is followed circumferentially, gradually as the exhaust gases cross the outlets 119, 121.

Moreover, and as illustrated in FIG. 13, the height of the outlets 119, 121 increases when they are followed circumferentially from the inlet 39. Indeed, for purely geometrical reasons, the height of the outlets 119, 121 should run along the edges of the cup 27. The reason is that it is necessary that the inlet section of the conduit substantially corresponds to the outlet section of the conduit. Thus, with a sufficient length of the conduits, it would be possible to have a height of the outlets 119, 121 which remains equal when they are followed circumferentially from the inlet 39.

All in all, the four outlets 119, 121 have a passage section at least equal to that of the inlet 39, in order to reduce the counter-pressure.

The outlets 119, 121 are positioned symmetrically with respect to a plane containing the central line L and the injection channel 59.

The operation of the exhaust line according to the second embodiment will now be described.

The exhaust gases flowing out through the outlet face 24 of the upstream unit will directly hit the large upstream face 29 of the cup 27. A portion of the gases is directly collected by the injection channel 59, and is deviated along the channel as far as the inlet 39. The fraction of the exhaust gases spraying both wings 113 is guided by the wings 113 as far as the injection channel 59. The gases are then channeled by the injection channel 59 as far as the inlet 39.

The injector 15 injects a reagent jet into the injection channel, along an injection direction substantially with co-current outflow of the exhaust gases flowing in the injection channel 59 as far as the inlet 39.

The exhaust gases separate into two equal flows, each of both flows flowing in one of the conduits 37. This separation is facilitated by the vertical rib 139, which is substantially in the middle of the inlet. This gives the possibility of reducing the counter-pressure generated by the change in direction of gas flows. The vertical rib 139 gives the possibility of dividing the exhaust gas flow in an accurate and less dependent way as regards geometrical defects.

Once the reagent jet has crossed the inlet 39, it will impact the impact area 127, on either side of the vertical rib 139. The reagent begins to evaporate and optionally be transformed into ammonia, during its through-passage along the injection channel 59, but its optional evaporation and transformation mainly take place once the impact on the impact area causes the bursting of the jet into a multitude of droplets. One portion of the exhaust gases crossing the inlet 39 is itself also projected on the impact area, which drastically increases the diffusion of ammonia in the gas.

Moreover, the shape of the concave areas 123, 125 is selected to generate vortices having the purpose of uniformly mixing the reagent in the exhaust gases. The horizontal ribs 141 significantly contribute to the generation of vortices, because they push the exhaust gases towards the upper and lower portions of the conduits 37.

The exhaust gases then cover the conduits 37 as far as the outlets 119, 121. The shape and the position of these outlets are such that the exhaust gases enter the downstream space 35 as most tangentially as possible, under the wings 113 of the cup 27. The flow lines join up under the injector 15, upstream from the injection channel 59. At this stage, there is very little space between the cup 27 and the inlet face 25, so that the exhaust gases will change direction to follow a trajectory parallel to the injection channel 59, towards the inlet 39. Two re-circulations are thereby generated under the wings 113, these circular re-circulations being separated from each other by the channel 59. This promotes homogeneous distribution of the exhaust gases over the inlet face 25 of the downstream unit 5.

The cup 27 therefore has a double function, of collecting the exhaust gases leaving the outlet face 24 of the upstream unit 3, and diffusing the exhaust gases loaded with reagent over the inlet face 25 of the downstream unit 5.

The fact that the injection is achieved with co-current flow of the exhaust gases has the advantages mentioned above, i.e. the reagent jet is not deviated according to the flow rate of exhaust gas.

The counter-pressure generated by the injection segment is very moderate, because of the large passage sections provided to the exhaust gases in the conduits 37. It should be noted that the positioning of the injector with respect to the vertical rib should give the possibility of dividing the reagent jet into two equal portions, on either side of this vertical rib.

For manufacturing the exhaust line, the tubular portion 115 is first pierced in order to obtain the inlet 39, the outlets 119 and 121, and the holes 150 intended for the plug welds.

The cup 27 is obtained by stamping, including the tabs 147. The cup 27 is forcibly inserted into the tubular portion 115. The cup 27 is then welded on the tubular portion 115, with plug welds. It should be noted that the joint between the cup 27 and the tubular portion 115 is very good, so that possible exhaust gas leaks between both of these parts are negligible.

The shell 117 is obtained by hydroforming, or by any other suitable forming method, from a tube for which the inner diameter corresponds to the outer diameter of the tubular portion 115. It is then pierced so as to generate the orifice 143 intended for the part for attaching the injector. The shell 117 is then welded on the mantel over the whole of its periphery.

The injector support 101 is welded on the tubular portion 115. The upstream and downstream units 3, 5 are then inserted into the tubes 17 and 21 and the operation for clamping the webs 19, 23 then takes place.

A first alternative of the second embodiment of the invention will now be described with reference to FIG. 15. Only the points by which this alternative differs from that of FIGS. 9 to 14 will be detailed below. The identical elements or those ensuring the same functions will be designated with the same references.

Figure 15:
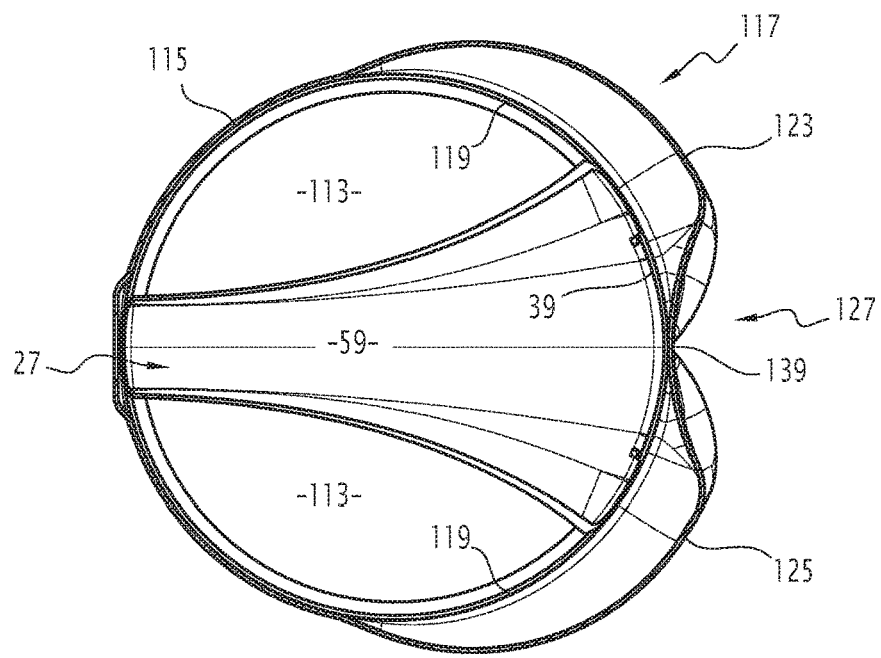
FIG. 15 is a similar sectional view to the one of FIG. 14, illustrating a first alternative of the second embodiment of the invention.
Figure 23:
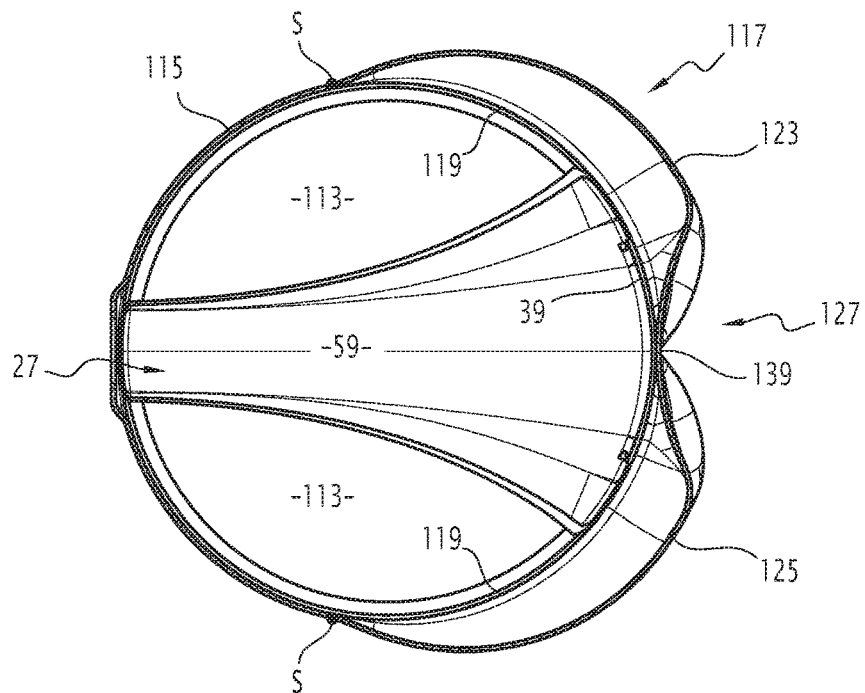
FIG. 23 is a view similar to the one of FIG. 15 and illustrates another alternative giving the possibility of forming circumferential conduits.

As visible in FIG. 15, the injection segment 7 only includes one single outlet per conduit 37, this outlet being referenced here as 119. The concave areas 123, 125 are therefore circumferentially shorter, and only extend over about 90° from the inlet 39. In this case, it is possible to obtain the shell 117 by hydroforming. In an alternative illustrated in FIG. 23, the shell 117 is obtained by standard stamping, with optionally a folding operation in order to form the vertical rib 139. It is then added onto the tubular portion 115 and attached to the latter for example by weld lines S.

Figure 16:
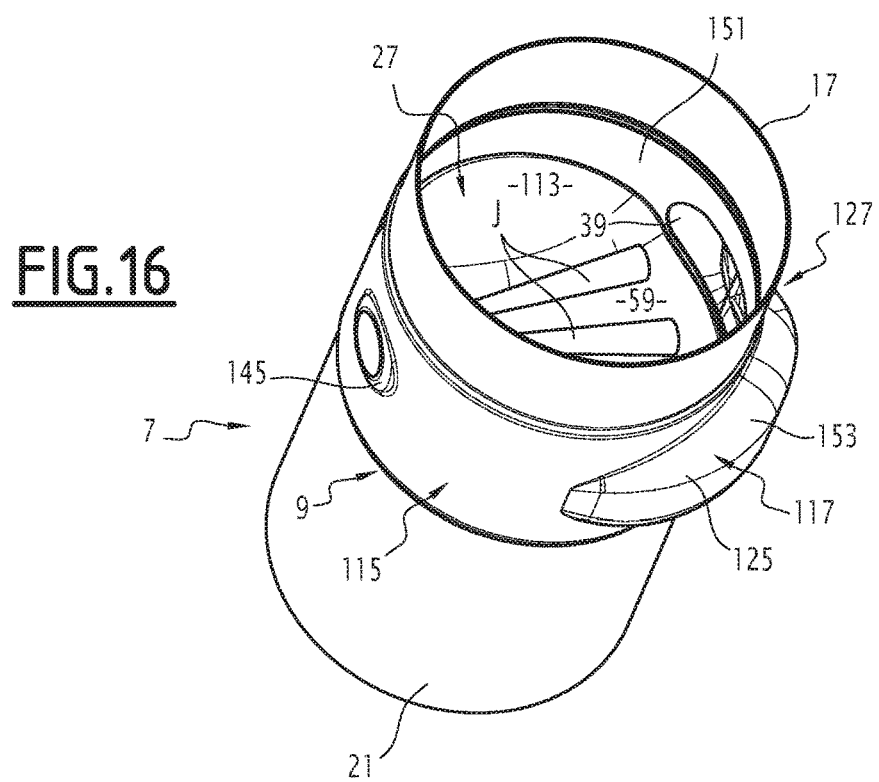
FIG. 16 is a perspective view illustrating a second alternative of the second embodiment of the invention.
Figure 17:
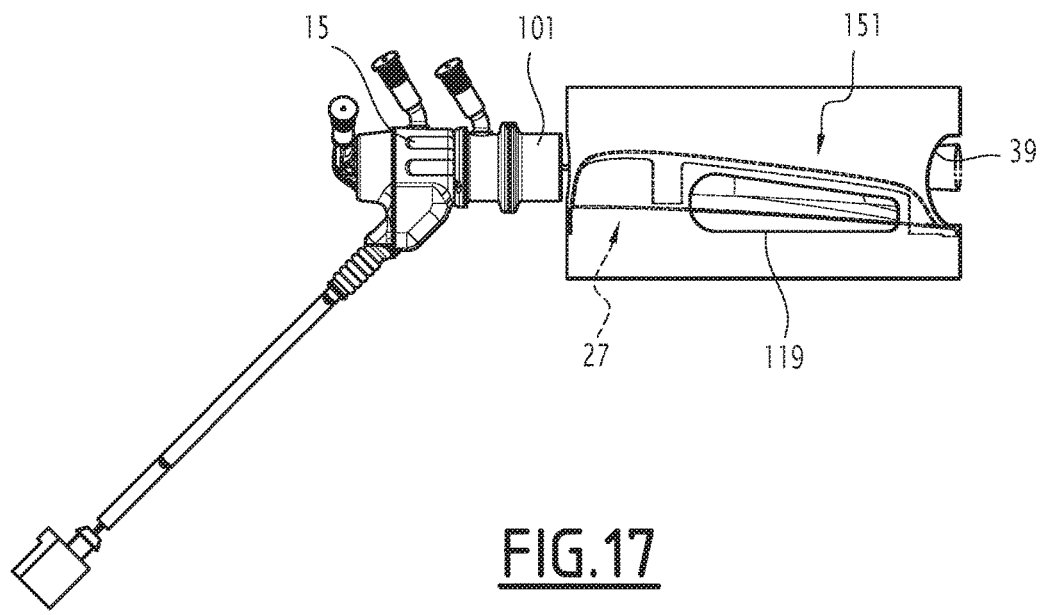
FIG. 17 is a side view showing an internal tube of FIG. 16.

A second alternative of the second embodiment of the invention will now be described with reference to FIGS. 16 and 17.

Only the points through which this alternative differs from that of FIGS. 9 to 14 will be detailed below. The identical elements or ensuring the same functions will be designated with the same references.

In this alternative, the shell 117 is made together with the same material as the tubular portion 115.

Moreover, the injection segment comprises an internal tube 151, accommodated in the tubular portion 115, each conduit 37 being delimited between the shell 117 and the internal tube 151.

The envelope 9 is obtained by deformation of an initially cylindrical part, the area intended to form the shell 117 is radially pushed back towards the outside of the cylinder, and therefore protruding outwards relatively to the remainder of this cylinder. The non-deformed portion makes up the tubular portion 115, and the deformed portion makes up the shell 117.

This shell 117 is delimited by a solid wall 153 outwards and is entirely open towards the inside.

Typically, this deformation operation is achieved by hydroforming.

The inlet 39 and the outlet orifices 119, 121 are cut out in the internal tube 151. Also, the orifice 143 provided for attachment of the injector support 101 is also cut out in the tube 151. The internal tube 151 is placed inside the tubular portion 115, and is coaxial with the central line L. It is flattened against the internal surface of the tubular portion 115, and placed facing the shell 117. Thus, the internal tube 151 closes the shell 117, on a radially internal side, over the whole of its circumferential length, except at the inlet 39 and the outlets 119, 121.

The cup 27 is engaged inside the internal tube 151 and is rigidly attached to the latter. The orifice 143 of the internal tube 151 is placed facing the orifice 145 of the tubular portion 115.

A third alternative of the second embodiment of the invention will now be described, with reference to FIGS. 18 and 19. Only the points by which this alternative differs from that of FIGS. 16 and 17 will be detailed below. Identical elements or those ensuring the same functions will be designated with the same references.

In this alternative embodiment, the envelope 9 has the same shape and is obtained in the same way as in the second alternative embodiment.

On the other hand, the internal tube 151 and the cup 27 are in one piece, and are typically made together in the same material. More specifically, the cup 27 includes a raised edge 155, protruding towards the upstream unit 3. The raised edge 155 extends over the perimeter of the wings 113 of the cup 27.

The raised edge 155 is separated into two portions by two notches 157, 159 diametrically opposite, located at both ends of the injection channel 59. The notch 157 defines the orifice 143 for receiving the injector support, and the notch 159 defines the inlet 39.

Both portions of the raised edge 155 are included in a cylinder with an external diameter corresponding to the internal diameter of the tubular portion 115. The raised edge 155 makes up the internal tube 151 of the second alternative embodiment.

The cup 27, bearing the raised edge 155, is inserted inside the tubular portion 115, so that the raised edge 155 is located facing the shell 117. This raised edge 155 obturates the conduits 37 on either side of the inlet 39, on a portion of the circumferential length of the conduits 37. On the other hand, the conduits 37, at their ends opposite to the inlet 39, are not obturated.

Thus, in the third alternative embodiment, the raised edge 155 does not include any outlet orifice.

The cup 27, with the raised edge 155, is typically obtained by stamping.

Figure 18:
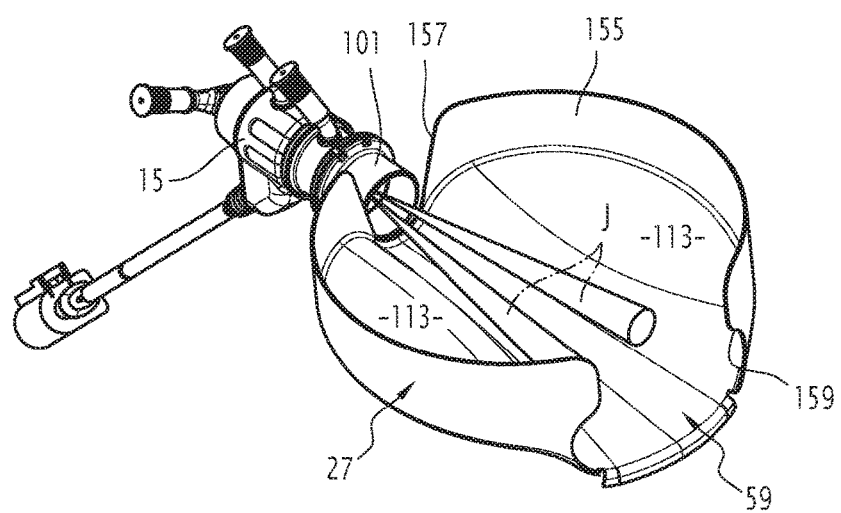
FIG. 18 is a perspective view illustrating a cup and an injector for a third alternative of the second embodiment of the invention.
Figure 19:
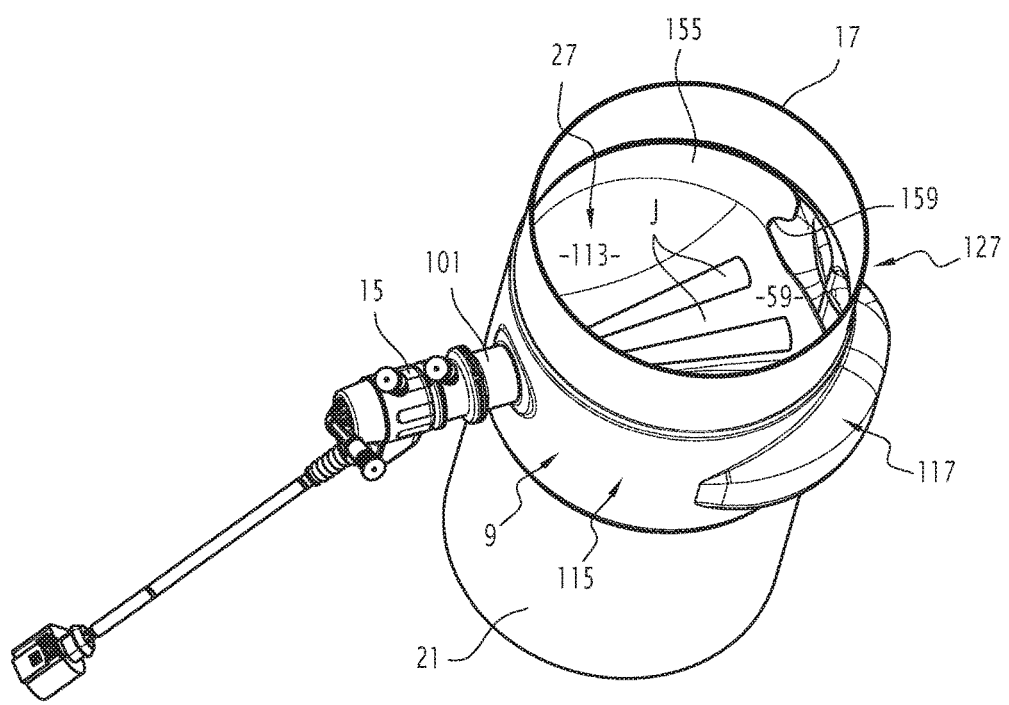
FIG. 19 is a perspective view similar to the one of FIG. 16, for the third alternative of the second embodiment of the invention.

The notches 157 and 159, in the example illustrated in FIGS. 18 and 19, are open towards the upstream unit 3. Alternatively, these notches 157 and 159 are replaced with orifices with a closed contour, cut out in the raised edge 155.

Figure 20:
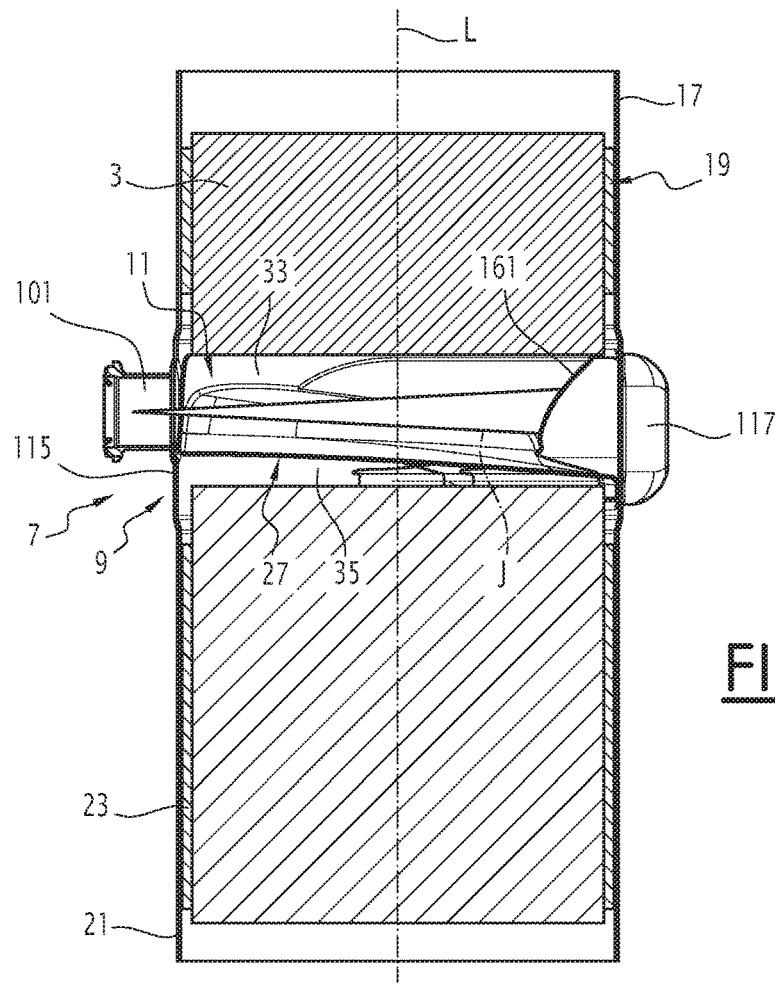
FIG. 20 is a side sectional view of a fourth alternative of the second embodiment of the invention.
Figure 21:
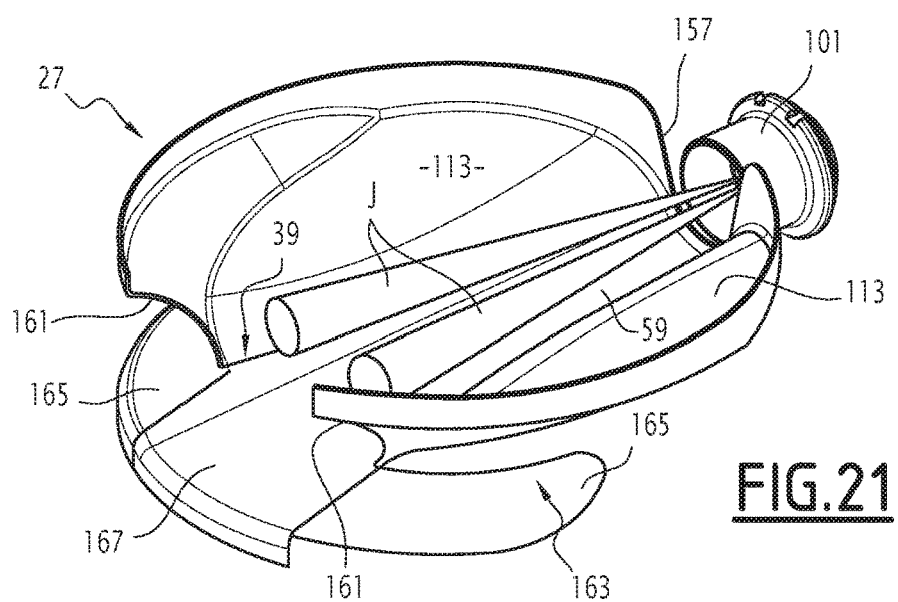
FIG. 21 is a perspective view of a cup and deflector of FIG. 20.

A fourth alternative of the second embodiment will now be detailed, with reference to FIGS. 20 and 21. Only the points by which this fourth alternative differs from the third alternative will be detailed below. Identical elements or those ensuring the same functions will be designated with the same references.

In this fourth alternative embodiment, the conduits 37 are located, for one portion or for the whole, inside the tubular portion 115.

In the exemplary embodiment illustrated in FIGS. 20 and 21, the envelope 9 includes the tubular portion 115 and the shell 117, but the passage section provided to the exhaust gas by the concave areas 123 and 125 is smaller than in the third alternative embodiment. For example, the height of the concave areas 123, 125 is reduced and substantially corresponds to the determined length separating the outlet 24 and inlet 25 faces.

The exhaust gases crossing the inlet 39 then partly circulate inside the concave areas 123 and 125, and partly circumferentially in a space of the tubular portion extending along the concave areas 123 and 125.

In order to provide the exhaust gases with a sufficient passage section, and therefore not to generate any excessive counter-pressure, the wings 113 of the cup are cut out, on either side of the inlet 39. These cutouts 161 are conformed so that the passage section provided to the exhaust gases from the inlet 39, through the sections delimited by the cutout 161 and the concave portions 123 and 125, substantially corresponds to the passage section of the inlet 39. The inlet 39, as compared with the third alternative embodiment, is slightly shifted towards the upstream side of the injection channel 59. It is delimited by the cutout 161.

The cutouts 161 generate notches on either side of the injection channel 59, immediately downstream from the inlet 39. These notches are located inside the tubular portion 115. Thus, a portion of the exhaust gases crosses the inlet 39 and is then circumferentially directed into the concave areas 123, 125. Another portion of the exhaust gases crosses the inlet 39, directly passes through the notches delimited by the cutouts 161, and circulate inside the tubular portion 115. This portion circulates circumferentially along the concave areas 123, 125, but outside the latter.

In order to avoid direct passage of the exhaust gases from the inlet 39, through the notches delimited by the cutouts 161, as far as the inlet face 25 of the downstream unit, the injection conduit includes a deflector 163 attached to the cup 27. Each conduit 37 is at least partly delimited towards the downstream unit 5 by the deflector 163 and towards the upstream unit 3 by one of the wings 113 of the cup.

As visible in FIG. 21, the deflector 163 comprises two plates 165 extending circumferentially from one end 167 of the channel 59 located immediately downstream from the inlet 39. The plates 165 extend circumferentially in the opposite direction of each other from the end 167. The plates 165 extend under the portions of the wings 113 which adjoin the cutouts 161. The plates 165 extend in a plane substantially perpendicular to the central line L, or on the contrary, have the shape of a helix portion wound around the central line L, from the end 167, and towards the downstream unit 5. The plates 165 may also have simpler shapes, notably of a half-crescent or substantially triangular, trapezoidal or rectangular, the list not being limited.

Each plate 165 is located along the internal tube, immediately under the concave areas 123, 125. It is meant here that the plates 165 are slightly shifted towards the downstream unit 5 relatively to the areas 123, 125. Circumferentially, the plates 165 extend over the whole length of the concave areas 123, 125. The plates 165 are made together in one piece, or on the contrary are independent of each other and each added onto the cup 27.

The deflector 163 gives the possibility of extending the travel time of the exhaust gases before the latter only attack the inlet face 25 of the downstream unit.

In the extreme, the envelope 9 does not include any shell 117, and only includes the tubular portion 115. It therefore has a tubular shape, without any protrusion protruding outwards with respect to the tubular portion 115. In this case, the exhaust gases circulate from the inlet 39, entirely inside the tubular portion 115. The notches delimited by the cutouts 161 then have passage sections all in all corresponding to that of the inlet 39.

Figure 22:
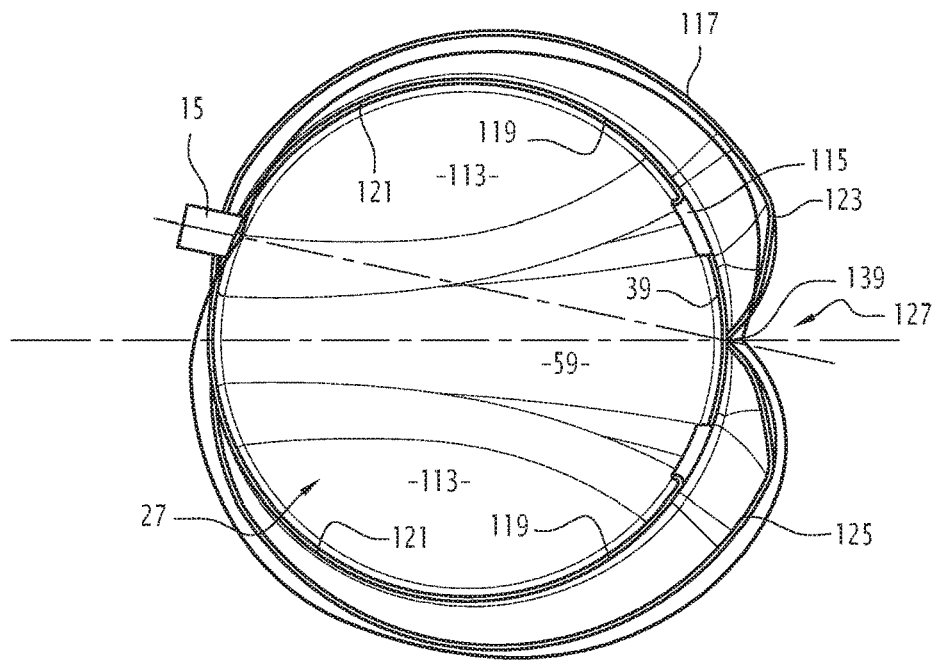
FIG. 22 illustrates a fifth alternative of the second embodiment of the invention.

It should be noted that, regardless of the alternative embodiment, the injector 15 is not necessarily exactly in the axis of the injection channel 59. The angle between the injection direction and the axis of the injection channel 59 may be comprised between plus 20° and minus 20°, as illustrated in FIG. 22. On the other hand, the impact point of the reagent jet is imperatively the impact area 127 in which is made the vertical rib 139. Beyond the angle of 20°, the trajectory of the reagent jets may be excessively deviated when the exhaust gas flow rate varies, and may only spray one of the sides of the vertical rib 139, which would cause great degradation of the mixing performances.

It is also conceivable to position the injector 15 so that the reagent distribution in each of the two conduits is not identical. The shapes of the cup and of the shell 117 are then modified accordingly, so that the gas flow is greater on the side where the major portion of the reagent flows.

As indicated above, each of the conduits 37 may have variable shape sections, depending on the congestion constraints. For example, the height of the conduit varies between 30 and 80 mm, and the depth between 20 and 40 mm. Beyond these limits, the vortices ensuring mixing between the reagent and the exhaust gases disappear, and the mixing becomes not as good.

In FIG. 12, the horizontal ribs 141 are included in a plane perpendicular to the central line L. The circumferential length of these ribs 141 is variable, and selected according to the geometry of the injection segment. Alternatively, the horizontal ribs 141 are not included in a plane perpendicular to the central line L but may be tilted relatively to such a plane. The horizontal ribs 141 located on either side of the rib 139 for example form together a V pointing downwards, or pointing upwards. Alternatively, they form an X, crossing each other at the vertical rib 139.

The determined length between the upstream unit 3 and the downstream unit 5 is typically comprised between 25 and 70 mm. For example, it has the value of 40 mm. When this length is small, the counter-pressure is increased. When the length is significant, the counter-pressure decreases but the size of the inlet 39 has to be large. It is then difficult to retain the mixing quality without modifying the shape of the horizontal ribs.

Like in the first embodiment, it is possible to make perforations in the cup 27. These perforations allow a portion of the exhaust gas flow to pass directly from the upstream space to the downstream space, without crossing the conduits. The number and the position of the perforations are selected so as to correct the distribution of reagent at inlet face 25, or decrease the amount of exhaust gas crossing the conduits 37, and therefore decreasing the overall counter-pressure.

As earlier, the central axes of the upstream and downstream units 3, 5 are typically aligned. Alternatively, these central axes are not aligned and form with each other an angle comprised between −30° and +30°.

Each conduit 37, according to an alternative embodiment, has an inlet which is specific to it, the inlets of both conduits 37 being physically and fluidically separate. Typically, both conduits are then entirely fluidically separated from each other.

Moreover, according to another alternative which may be applied to both embodiments, each conduit 37 includes several inlets, all opening into said conduit.

According to another alternative which may be applied to both embodiments, the injector 15 is oriented so as to inject the reagent against the flow of the exhaust gases in the injection channel 59. As compared with the version of the invention in which the injection is achieved against the current, the positions of the injector and of the impact area of the reagent jet are reversed. In the first embodiment, the injector is for example mounted on the conduit 37. In the second embodiment, the injector is for example mounted on the shell 117, instead of the impact area 127.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust line of an automobile vehicle comprising:
   upstream and downstream exhaust gas treatment units, the upstream and downstream exhaust gas treatment units being placed in series in an exhaust line;
   an injection segment comprising an envelope interiorly delimiting a circulation passage to circulate an exhaust gas flow extending from an outlet face of the upstream exhaust gas treatment unit as far as an inlet face of the downstream exhaust gas treatment unit, the passage having a central line having a determined length between the outlet and inlet faces, the injection segment including at least one flow guide positioned inside the circulation passage in the path of the exhaust gas flow so that the average travel of the exhaust gas veins is greater by at least 20% relatively to the determined length, the flow guide having a large upstream face directly sprayed with the exhaust gases leaving the upstream exhaust gas treatment unit and dividing the circulation passage into an upstream space extending between the outlet face and the flow guide, and a downstream space extending between the flow guide and the inlet face;
   an injection device including a reagent injector provided to inject a reagent into the injection segment;
   wherein
   the injection segment comprises at least one conduit fluidically connecting the upstream space to the downstream space, the conduit having at least one inlet opening into the upstream space and at least one outlet opening into the downstream space, each inlet being connected to at least one outlet, the conduit extending around the central line;
   the large upstream face of the flow guide defines at least one injection channel, and at least one guiding area laid out to guide as far as said injection channel a portion of the exhaust gases spraying the large upstream face; and
   the injector being oriented to inject the reagent with co-current or counter-current flow of the exhaust gases upstream of the flow guide in the injection channel, the injection channel extending from the injector as far as the inlet of the conduit.

2. The exhaust line according to claim 1, wherein the flow guide defines at least one direct guiding area laid out to guide a second portion of the exhaust gases spraying the large upstream face directly as far as the inlet of the conduit without passing through the injection channel.

3. The exhaust line according to claim 2, wherein the envelope has a rectilinear strip along the injection channel.

4. The exhaust line according to claim 2, wherein the flow guide is shaped to have a main portion forming at least the injection channel and the direct guiding area, and a protruding portion that protrudes towards the outlet face of the upstream exhaust gas treatment unit from the main portion, the direct guiding area being delimited on one side by the envelope, on the other side by the protruding portion, and opening into the injection channel.

5. The exhaust line according to claim 4, wherein the protruding portion extends from a peripheral edge of the flow guide as far as a center of the flow guide.

6. The exhaust line according to claim 4, wherein the protruding portion delimits an outlet of the conduit opening into the downstream space.

7. The exhaust line according to claim 1, wherein the envelope comprises two half-shells delimiting between them the conduit.

8. The exhaust line according to claim 1, wherein the injection segment comprises two conduits fluidically connecting at least one inlet to at least one outlet opening into the downstream space, and extending in opposite directions from the inlet around the central line.

9. The exhaust line according to claim 8, wherein the flow guide has two wings positioned on either side of the injection channel, both wings being tilted so that, from the injection channel, the wings move away from each other and extend towards the upstream exhaust gas treatment unit.

10. The exhaust line according to claim 8, wherein the conduits are delimited by an external wall, the external wall including a vertical rib parallel to the central line at the center of the inlet.

11. The exhaust line according to claim 8, wherein each conduit is delimited outwards by the envelope and is open towards the inside over substantially an entire length of the conduit.

12. The exhaust line according to claim 11, wherein the flow guide has two wings positioned on either side of the injection channel, both wings being tilted so that, from the injection channel, the wings move away from each other and extend towards the upstream exhaust gas treatment unit, and wherein the wings have notches on either side of the inlet for the passage of the exhaust gases from the inlet into the conduits.

13. The exhaust line according to claim 1, wherein the envelope comprises a tubular portion in which is accommodated the flow guide and a shell added onto the tubular portion and delimiting said or each conduit.

14. The exhaust line according to claim 1, wherein the envelope comprises a tubular portion in which is accommodated the flow guide and a shell made in one piece with the tubular portion and protruding outwards from the tubular portion, the shell delimiting said or each conduit.

15. The exhaust line according to claim 14, wherein the injection segment further comprises an internal tube accommodated in the tubular portion, each conduit being delimited between the shell and the internal tube, the internal tube being made in one piece with the flow guide.

* * * * *